May 16, 1933.   R. S. RICHARDSON   1,909,378
SYNTHETIC PRODUCTION OF AMMONIA FROM A GASEOUS MIXTURE OF
NITROGEN AND HYDROGEN IN THEIR COMBINING PROPORTIONS
Filed Dec. 6, 1927
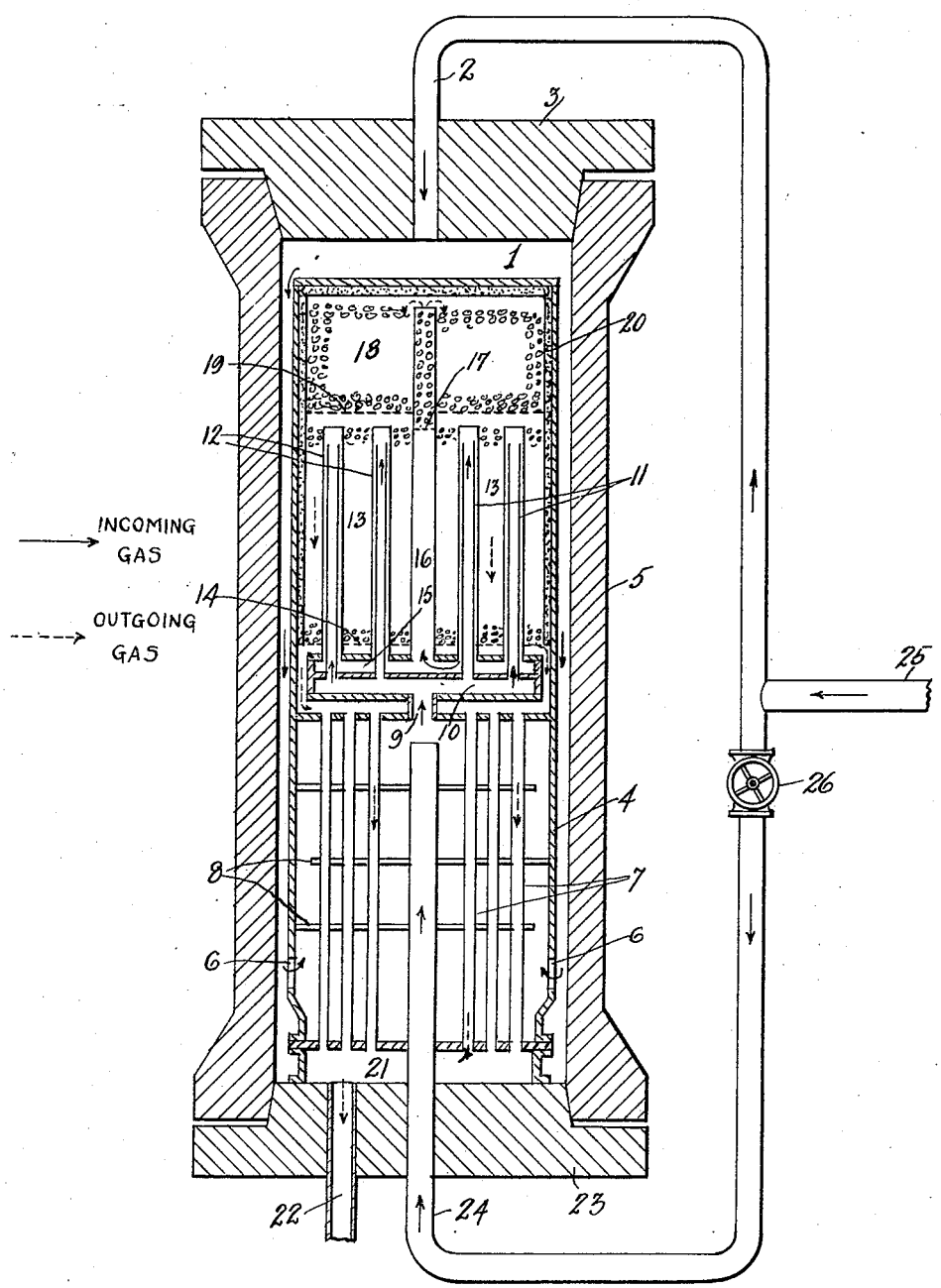
INCOMING GAS →
OUTGOING GAS ╌╌►
INVENTOR
Ralph S. Richardson.
BY
Philip C. Reeb
ATTORNEY Patented May 16, 1933

1,909,378

UNITED STATES PATENT OFFICE

RALPH S. RICHARDSON, OF TEANECK, NEW JERSEY, ASSIGNOR TO CHEMICAL ENGINEERING CORPORATION, OF NEW YORK, N. Y., A CORPORATION OF DELAWARE

SYNTHETIC PRODUCTION OF AMMONIA FROM A GASEOUS MIXTURE OF NITROGEN AND HYDROGEN IN THEIR COMBINING PROPORTIONS

Application filed December 6, 1927. Serial No. 238,109.

This application is a continuation in part of my application for patent Serial No. 78,286 filed December 30, 1925, now Patent No. 1,707,417, as to all subject-matter common to both applications.

My invention relates broadly to improved methods for controlling the temperatures in the catalyst used and has for its object to increase the output of ammonia to the maximum point by maintaining the optimum temperatures throughout the entire body of the catalyst whereby the maximum yields may be obtained in a single passage of the nitrogen and hydrogen gases through the catalyst.

In the synthesis of ammonia the combined nitrogen and hydrogen gases are compressed to an elevated pressure, heated to a suitable temperature ranging from 400° to 600° C. and passed over a suitable catalytic agent whereby a certain proportion of the combined gases is converted into ammonia.

In industrial practice the pressure of the nitrogen-hydrogen gases in contact with the catalyst is constant or nearly so; any change in pressure is usually occasioned merely by resistance to the gaseous flow through the catalyst.

In industrial operations many difficulties are encountered in maintaining the catalyst at an optimum temperature after being initially heated from within, since variations of such temperature in either direction lowers the conversion efficiency of the catalyst with decreased yields. It has been found that too low temperatures greatly decrease the activity of the catalyst, so that cooling takes place below that required to maintain the reaction, and therefore production of ammonia ceases entirely.

Furthermore in industrial practice on a commercial scale, it has been found that the portion of the catalyst, which first comes in contact with the gas mixture where the activity is more intense, may become injured by overheating or even poisoned by impurities in the gases. Even though such heat is removed by suitable cooling surfaces surrounding that portion of the catalyst, yet local overheating is likely to occur in the catalyst mass.

The importance of maintaining the catalyst at optimum temperatures has long been recognized and various methods have been proposed for accomplishing this result.

Heretofore removal of the heat of reaction has been accomplished throughout the catalyst in practice by use of heat transfer surfaces suitably disposed within the catalyst mass, but such system of control inevitably permits great differences in temperature in various isolated parts of the catalyst mass, and especially allows no adequate control of temperature capable of being varied with operating conditions to secure optimum temperature for maximum conversion.

According to my invention, the gases are first heated to the lowest temperature required for starting of the reaction by transfer of heat from the hot gases leaving the catalyst into the gases about to react supplemented by transfer of heat from one portion of the catalyst. I have discovered that it is neither necessary nor desirable to subject the entire mass of catalyst to a regulated cooling, but that the operating conditions may be improved and the yield of ammonia per unit of catalyst can be increased if the process is so conducted that one part of the catalyst is not subjected to any cooling. Accordingly I have shown a form of apparatus in which the first portion of the catalyst is not cooled while the second, and preferably greater, portion is subjected to a controllable cooling. I have also discovered that the initial formation of ammonia takes place more rapidly and at lower temperatures than the subsequent reaction, and that the temperature to which the gas can be introduced to the first portion of catalyst may be lower when the first portion of catalyst is not subjected to cooling.

The heat of reaction evolved during the passage of the gases over this first catalyst portion can best be utilized to increase the temperature of the reacting gases to a temperature best suited for conducting the remainder of the reaction. When the gases have been partially converted into ammonia in contact with the first catalyst portion and raised by the heat of reaction to the optimum temperature for the balance of the reaction in the second catalyst portion, the second catalyst portion can then be held at its optimum temperature by removal of the heat of reaction produced in the second catalyst portion by a regulated cooling. I prefer to regulate the cooling of the second catalyst portion by regulating the temperature of the gas entering into heat exchange relationship with said second catalyst portion and to produce this effect I prefer to admit cold gas into the warmer gas stream entering into heat exchange relationship with the second catalyst portion. The first catalyst portion should be so arranged that the heat loss from this portion is reduced to a minimum. In the drawing I have shown the catalyst container as insulated, and have passed the gas about to react peripherally of this catalyst in order to prevent loss of heat from the catalyst to the outside.

The accompanying drawing shows in diagrammatic form and in vertical section a suitable form of apparatus adapted for carrying out the improved processes of my invention.

Referring to this drawing, the nitrogen-hydrogen gas mixture at proper pressure and temperature is introduced into the catalyst-containing converter 1 by the inlet pipe 2 passing through the head 3. The gas mixture then passes downwardly through the annular space between the heat exchanger 4 and the pressure sustaining walls 5 of the converter and enters the heat exchanger 4 through the openings 6. The gases then pass upwardly around the tubes 7 of the heat exchanger 4 and around the baffles 8 and then through the port 9 into the chamber 10. From the chamber 10 the gases pass upwardly through the small tubes 11 telescoped within a like plurality of closed pipes 12, and then downwardly through the annulus between the tubes 11 and 12 in heat relationship, but not in direct contact, with the lower portion 13 of the catalyst supported on the grate 14 into the chamber 15 superposed above the chamber 10. From the chamber 15 the gases pass upwardly through the center pipe 16, the upper part of which may be packed with catalyst resting on the perforated plate 17. The gases leaving the top of the pipe 16 are brought into actual contact with the first portion 18 of the catalyst supported on the perforated plate 19, such first catalyst portion 18 being surrounded by the insulation 20. Leaving the first catalyst portion 18 through the plate 19, the gases pass downwardly through the second catalyst portion 13 and during the reaction most of the heat produced is removed by the cooling pipes 12 and imparted to the reacting gases passing downwardly through such pipes 12. The reacting gases now pass downwardly through the grate 14 which supports this second catalyst portion 13, and then through the tubes 7 of the heat exchanger 4 where the heat of the gases leaving the reaction is used to preheat the incoming gases on the way to the reaction. The gases leaving the tubes 7 of the heat exchanger are collected in the chamber 21 and leave the converter 1 through the outlet 22 formed in the bottom 23. Passing upwardly through the bottom 23 is the pipe 24 by which a part of the cold gas from the main pipe 25 controlled by the valve 26 may be mixed with the incoming gases already heated in the heat exchanger 4. Such by-passing of a part of the gases to be reacted serves to produce a regulated cooling of the second catalyst portion 13 through the lowered temperature of the gases passing through the cooling pipes 12 thereby removing some of the heat of reaction produced in this second catalyst portion 13.

The arrows with solid lines indicate the path of the gases going to the catalyst, while the arrows with the broken lines show the path of the gases in and after passing through the catalyst. The temperature control methods such as I have described whereby the entire mass of the catalyst may be maintained at optimum temperature for the maximum production of ammonia may be varied in many ways without departing from the nature of the invention and without sacrificing its chief advantages.

I claim as my invention:—

1. The process of producing ammonia by passing nitrogen and hydrogen gases over a catalyst at high temperatures and pressures, which comprises first passing preheated gases in reacting contact with a separated portion of the catalyst, and then in reacting contact with another separated portion of the catalyst, while removing a predetermined amount of the heat of reaction produced in the second catalyst portion.

2. The process of producing ammonia by passing nitrogen and hydrogen gases over a catalyst at high temperatures and pressures, which comprises first passing preheated gases in reacting contact with a separated portion of the catalyst, and then in reacting contact with another separated portion of the catalyst, while removing a predetermined amount of the heat of reaction produced in the second catalyst portion by passing the incoming gases mixed with cooler gases in heat exchange relation but out of direct contact therewith.

3. The process of producing ammonia by passing nitrogen and hydrogen gases over a catalyst at high temperatures, and pressures, which comprises first passing preheated gases in reacting contact with a separated portion of the catalyst, and then in reacting contact with another separated portion of the catalyst, of greater content than said first portion, while removing some of the heat of reaction produced in the second catalyst portion.

4. The process of producing ammonia by passing nitrogen and hydrogen gases over a catalyst at high temperatures and pressures, which comprises first passing preheated gases in reacting contact with a separated portion of the catalyst, and then in reacting contact with another separated portion of the catalyst, of greater content than said first portion, while removing some of the heat of reaction produced in the second catalyst portion by passing the incoming gases in heat contiguity but out of direct contact therewith.

5. In the synthetic production of ammonia by passing nitrogen and hydrogen gases at high temperatures and pressures through a catalyst arranged in separated portions, the step which consists in removing a predetermined amount of the heat produced in the second catalyst portion by passing the incoming gases in heat exchange relation, but out of direct contact, with said second portions before the hot gases are brought into reacting contact with the first catalyst portion.

6. In the synthetic production of ammonia by passing nitrogen and hydrogen gases at high temperatures and pressures through a catalyst arranged in separated portions, the step which consists in removing heat produced in the second catalyst portion by passing the incoming controllably preheated gases in heat exchange relation, but out of direct contact, with said second portion before the hot gases are brought into reacting contact with the first catalyst portion.

7. In the synthetic production of ammonia by passing nitrogen and hydrogen gases at high temperatures and pressures through a catalyst arranged in separated portions, the step which consists in removing heat produced in the second catalyst portion by passing the incoming gases mixed with cooler gases in controllable amounts in heat exchange relation, but out of direct contact, with said second portion before the hot gases are brought into reacting contact with the first catalyst portion.

8. In the synthetic production of ammonia by passing nitrogen and hydrogen gases in successive reacting contacts with separated portions of a catalyst, the steps which consist in subjecting the second catalyst portion to regulated cooling by passing preheated incoming gases in heat exchange relation, but out of direct contact, with said second catalyst portion before such gases are passed through the successive portions of the catalyst, and in introducing comparatively cooler gas in controllable amounts to said incoming gases before the combined flow is brought into heat exchange contiguity with said second catalyst portion.

9. In the synthetic production of ammonia by passing nitrogen and hydrogen gases in successive reacting contacts with separated portions of the catalyst, the steps which comprise first passing the gases through a relatively small portion of the catalyst and then passing same successively through, and simultaneously cooling, the separated major portions of the catalyst.

10. In the synthetic production of ammonia by passing nitrogen and hydrogen gases in successive reacting contacts with separated portions of a catalyst, the steps which comprise first passing the gases through a relatively small portion of the catalyst and then passing same successively through separated major portions of the catalyst, while removing some of the heat of reaction from the second catalyst portion.

11. In the synthetic production of ammonia by passing nitrogen and hydrogen gases over a catalyst at high temperatures and pressures, the method which comprises enveloping the catalyst with the incoming gases by passing same peripherally of the catalyst, then passing such gases through a portion of the catalyst in heat exchange relation but out of direct contact therewith, then passing the hot gases in reacting contact with another portion of the catalyst, and finally passing same through said first portion in direct contact therewith.

12. In the synthetic production of ammonia by passing nitrogen and hydrogen gases over a catalyst at high temperatures and pressures, the method which comprises enveloping the catalyst with the incoming gases by passing same peripherally of the catalyst, then passing such gases through a portion of the catalyst in heat exchange relation but out of direct contact therewith, then passing the hot gases in reacting contact with another portion of the catalyst, and finally passing same through said first portion in direct contact therewith, while introducing comparatively cooler gas in controllable amounts to said incoming gases before the combined flow is brought into heat exchange contiguity with said first catalyst portion.

13. In the synthetic production of ammonia by passing nitrogen and hydrogen gases over a catalyst at high temperatures and pressures, the method which comprises enveloping the catalyst with the incoming gases by passing same peripherally of the catalyst, then passing such gases through a portion of the catalyst in heat exchange relation but out of direct contact therewith, then passing the hot gases in reacting contact with another portion of the catalyst, and finally passing same through said first portion in direct contact therewith while lowering the temperature of the incoming gases to the first catalyst portion by variably mixing same with cooler gas in controllable amounts before the combined flow is brought into heat exchange contiguity with said first catalyst portion.

14. The method of effecting catalytic exothermic gaseous reactions, which comprises passing preheated gases in reacting contact with a separated portion of the catalyst and then in reacting contact with another separated portion of the catalyst while removing some of the heat of reaction produced in the second catalyst portion by heat exchange of said gases with said second portion.

15. The method of effecting catalytic exothermic gaseous reactions, which comprises conveying a gaseous stream through but not in direct contact with the catalyst and, simultaneously, in heat exchange relation with succeeding portions of the stream and thereafter delivering the gaseous stream to the catalyst.

16. The method of effecting catalytic exothermic gaseous reactions, which comprises interposing a gaseous stream, within and in heat exchange relation to but not in direct contact with the catalyst, between the catalyst and succeeding portions of the stream, the latter portions being thereby heated to a temperature approaching that of the catalyst and finally delivering the gaseous stream after heat exchange therewith to the catalyst.

17. In an apparatus for effecting catalytic gaseous reactions, a catalyst, means to convey a gaseous stream through the catalyst and means within the catalyst to return the gaseous stream between the catalyst and succeeding portions of the stream.

18. A converter for carrying out vapor phase catalytic reactions which comprises in combination a catalyst layer, at least one heat exchanging element at least partly embedded therein, means for passing reaction gases through said heat exchange elements out of direct heat exchange relation with the catalyst, reversing their flow so as to be in direct heat exchanging relation with the catalyst and with succeeding portions of the reaction gas flow and means for delivering the gases after leaving the heat exchange elements to the catalyst.

19. A converter for carrying out vapor phase catalytic reactions comprising in combination a catalyst layer, at least one heat exchange element at least partly embedded therein, said heat exchange element comprising an open end tube extending into a closed end tube, means for conducting incoming reaction gases into the open end tube and means for delivering the gases issuing from the annular space between the open end tube and the closed end tube to the catalyst.

20. The method of effecting the catalytic synthesis of ammonia which comprises passing a mixture of nitrogen and hydrogen to the reaction within but not in direct contact with the catalyst and between the catalyst and succeeding portions of the mixture.

21. The method of effecting catalytic synthesis of ammonia, which comprises conveying a gaseous stream of nitrogen and hydrogen through but not in direct contact with the catalyst and, simultaneously, in heat exchange relation with succeeding portions of the stream and thereafter delivering the gaseous stream to the catalyst.

22. In an apparatus for effecting catalytic gaseous reactions, a catalyst and means within the catalyst to convey a gaseous steam in heat exchange relation with preceding portions thereof and then with the catalyst.

23. In an apparatus for effecting catalytic gaseous reactions, a catalyst, means to convey a gaseous stream through the catalyst and means within the catalyst to return the gaseous stream between the catalyst and succeeding portions of the stream.

24. The method of effecting catalytic exothermic gaseous reactions which comprises passing the gases going to the reaction within but not in direct contact with the catalyst and between the catalyst and succeeding portions of gases going to the reaction.

25. The method of effecting catalytic exothermic gaseous reactions wherein the catalyst is protected from excessive cooling, which includes the steps of passing the incoming gases within the catalyst but not in direct contact therewith, and passing between said incoming gases and the catalyst a flow of gases which have already been warmed by heat exchange with the catalyst.

26. The method of effecting catalytic exothermic gaseous reactions which comprises passing a gaseous stream within and in heat exchange relation to, but not in direct contact with the catalyst, between the catalyst and succeeding portions of the stream, the latter portions being thereby heated to a temperature approaching that of the catalyst, and finally delivering the gaseous stream after heat exchange therewith to the catalyst, and regulating the heat exchange to cool the catalyst and bring the entering gas to proper reaction temperature with respect to the catalyst, by controlling the volume of an interposed gas of a different temperature from that of the main stream.

RALPH S. RICHARDSON.